UNITED STATES PATENT OFFICE.

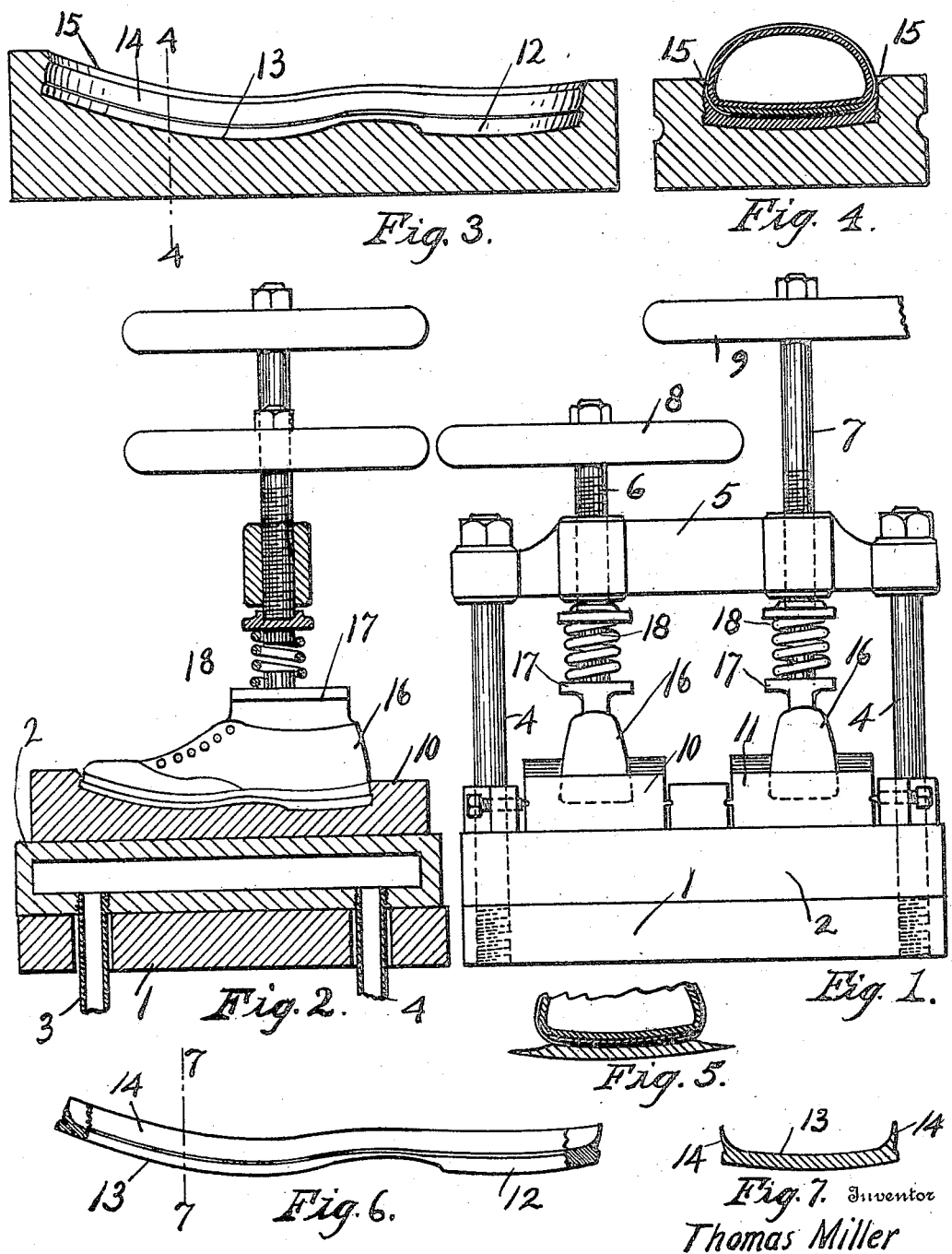

THOMAS MILLER, OF AUBURN, RHODE ISLAND.

MECHANISM FOR MOLDING AND VULCANIZING RUBBER SOLES ON SHOES.

No. 817,791.  Specification of Letters Patent.  Patented April 17, 1906.

Application filed June 19, 1905. Serial No. 265,941.

*To all whom it may concern:*

Be it known that I, THOMAS MILLER, a citizen of the United States of America, residing at Auburn, in the county of Providence and State of Rhode Island, have invented certain new and useful Improvements in Mechanism for Molding and Vulcanizing Rubber Soles on Shoes, of which the following is a specification, reference being had therein to the accompanying drawings.

This invention relates to a means for vulcanizing rubber soles to shoes, and has for its object to provide a simple apparatus whereby rubber soles, heels, and foxing may be molded onto canvas or other shoes and secured permanently thereon by vulcanization of the rubber while under great pressure.

An essential feature of this device is the molding of soles of rubber or other plastic material onto canvas or other shoes—such as tennis, yachting shoes, or the like—where it is desirable or necessary to provide the same with a foxing-strip around the vamp, such as that shown in the drawings. The ordinary way of making these canvas shoes is to form the rubber sole separate, cement it onto the upper, and then place the shoe and sole into an oven and vulcanize them without the use of pressure. When shoes are thus constructed, the foxing and soles are very apt to separate or peel off from the upper or vamp. They are also rough and clumsy looking and do not present a finished appearance, as is the case when they are molded into exactly the required form under pressure.

The preferred manner of forming this improved sole is to last up the shoe in the usual way. Then before it is removed from that last the outer rubber sole is prepared and laid onto the bottom of the shoe. The whole is then forced by a heavy pressure into a heated mold of the desired shape to form the heel, sole, and foxing complete, and in three or four minutes the operation is finished and the shoe removed completed.

When the sole is formed onto the shoe in a mold under great pressure, the inner sole, filling-sole, lapping portion of the vamp, outer sole, (made plastic by the heat,) and the foxing are all compressed and vulcanized together into practically one solid piece handsomely finished and making it practically impossible for the parts to separate or become detached one from the other.

The invention consists of other novel features and parts and combinations of the same, as will be fully described hereinafter and then pointed out in the appended claims.

A practical embodiment of the invention is represented in the accompanying drawings, forming a part of this specification, in which similar characters of reference indicate corresponding parts in all the views.

In the drawings, Figure 1 is a side elevation showing a clamping-press with two shoes in position to have their soles vulcanized thereon. Fig. 2 is a side elevation, partly in section, showing the clamping device, steam-chamber, and a shoe in position in the mold. Fig. 3 is a sectional view of the mold, showing the heel-sole and that portion which molds the foxing. Fig. 4 is a sectional view on line 4 4 of Fig. 3 through the mold, showing a shoe and last in position in said mold to vulcanize the rubber sole thereon. Fig. 5 is a sectional view showing the construction of a shoe and the rubber sole applied thereto with skived or beveled edges in a condition to be forced into the mold and turned up around the edges of the shoe to form the sole and foxing. Fig. 6 is a side elevation representing the heel, sole, and foxing separate from the shoe. Fig. 7 is a sectional view on line 7 7 of Fig. 6.

Referring to the drawings, at 1 is the table or stand upon which the steam-chest 2 may rest, or the stand and steam-chest may be one and the same piece, if desired, and at 3 and 4 are pipes communicating with said steam-chest. Connected to this table by the rods 4 4 is the yoke 5, through which yoke the clamping-screws 6 and 7 are threaded. These screws are rotated or set up by their respective hand-wheels 8 and 9. The press may be of a width to accommodate any desired number of molds, and the pressure may be applied by a screw, air-pressure, spring tension, or any other convenient or desired method.

Resting upon the steam-chest are shown the two molds 10 and 11. These molds are constructed, as illustrated in Figs. 3 and 4, with the exact contour of the sole of the shoe it is desired to mold, including the heel 12, sole 13, and foxing 14. The mold is also so constructed that when the shoe on the last is in position in the same it fits the line 15 on the mold at the upper edge of the foxing so closely as to confine the rubber in the mold while under pressure to offer enough resistance to cause the plastic rubber to be forced into the pores of the material of the upper or vamp of the shoe, thereby rendering the sole and foxing practically inseparable from said upper 16.

At 17 is the last over which the shoe is made, and at 18 18 are the springs located between the lasts and the tension-screws, by the use of which springs a flexible tension is obtained to compensate for settling of the last as the plastic rubber is being molded or forced into shape.

The operation of the device may be further described as follows: While by the use of my device rubber soles may be applied to any style of shoe, it is preferably designed to mold a heel, sole, and foxing of rubber or other plastic material around a canvas shoe, such as tennis-shoes, or the like. These shoes are lasted up in the usual way, and the outer sole to be vulcanized is cut into the desired shape from a sheet of the rubber material. One manner of cutting out the sole-blank is to make the same the exact size required for the shoe and then cut the foxing-strip to the desired shape and lay the same around the sole and upper of the shoe in the mold, or the sole may be cut enough larger and beveled or skived, as at 19, (see Fig. 5,) to form both sole and foxing in one piece when pressed into the mold, or still another way would be to cut the sole the exact size of the bottom of the shoe, but to cut the same from material of sufficient thickness so that when pressed into the mold and heated the extra stock will flow up around the vamp to form the foxing portion.

It has been practically demonstrated that by the application of a great pressure while the sole is being vulcanized the same becomes more solid and compact and wears much longer than when vulcanized without this pressure, and also when vulcanized under pressure on the shoe the material enters the pores of the upper, making it practically impossible to separate the same therefrom.

Among the essential features of my device are the following: First, that means are provided for forming a heel, sole, and foxing portion complete all in one piece in a mold; second, that the said mold is formed in only one piece, and therefore the expense of manufacturing the same is greatly reduced; third, more particularly in the making of rubber shoes these heels, soles, and foxing may be molded and partially vulcanized separate and independent of the upper and subsequently cemented to said upper and the whole then completely vulcanized in the usual way by placing them in an oven without the use of pressure. This method of molding and semi-vulcanizing the sole, heel, and foxing separately from the upper has its special and important advantages over the old way of making the shoe wholly by hand, one advantage being that the shoe when completed has a perfect shape and a finished appearance the same as a wholly-molded shoe. Then, again, by molding the heel, sole, and foxing into one piece it is naturally much stronger, and as the greatest wearing strain comes on this portion of the shoe the wearing life of the whole shoe is greatly increased. Again, varnish applied to a rubber shoe that is subsequently vulcanized without being molded will keep its luster much longer than when the shoe is formed in a mold, as by this method the varnish is baked into the shoe and cannot be easily removed.

The above is a most simple, practical, inexpensive, and efficient manner of applying rubber soles to canvas shoes or the like, as the vulcanizing may be accomplished by the use of a last, mold, and steam-chest and the pressure applied by any ordinary screw-press, if desired. The expense of manufacturing is greatly facilitated over the ordinarily complicated and expensive means heretofore employed.

Having thus described my invention, what I claim as new, and desire to secure by Letters Patent, is—

1. In a device of the character described, a mold adapted to form the heel, sole and foxing portion of a shoe from rubber or other plastic material, means for applying heat to said mold for vulcanizing its contents, means for applying pressure to said mold while vulcanizing, and means for causing resistance to the plastic material so the same will be forced into the pores of the upper.

2. In a device of the character described, a mold adapted to form the heel, sole and foxing portion only of a shoe, a last adapted to fit into said mold and assist in the formation of said heel, sole and foxing portion therein, said mold being so formed as to closely engage the foxing-line of said last to cause a resistance and prevent the free flowing of the material therefrom, and means for applying heat and pressure to the material.

3. In a device of the character described, a mold adapted to form the heel, sole and foxing portion of a shoe, a last over which a shoe may be formed the same being adapted to fit the mold and assist in the formation of the heel, sole and foxing therein, means for applying heat and pressure to the material, and means in said last and mold for causing resistance to the plastic material so that the same will be formed into the pores of the upper.

4. In a device of the character described, a mold adapted to form the heel, sole and foxing portion of a shoe, a last over which a shoe may be formed the same being adapted to fit the mold and assist in the formation of the heel, sole and foxing therein, said mold being so formed as to closely fit the upper on the last at the foxing-line thereof to cause a resistance and insure the plastic material being forced into the pores of the upper, and means for applying heat and pressure to the material.

5. In a device of the character described, a mold adapted to form the heel, sole and foxing portion of a shoe from rubber or other plastic material, means for applying heat to said mold for vulcanizing its contents, a last or form to assist in the formation of the heel, sole and foxing portion, means for applying pressure to said mold while vulcanizing, and means engaging the foxing-line to better retain the material while under pressure.

6. In a device of the character described, a mold formed in one piece adapted to form the heel, sole and foxing portion of a shoe, a last adapted to fit into said mold and assist in the formation of said heel, sole and foxing portion therein, said mold being so formed as to closely engage the foxing-line of said last to cause a resistance and prevent the free escape of the material in order to compress and harden the same, means for applying heat, and flexible means for applying pressure to the material.

7. In a device of the character described, a mold made in one piece adapted to form heel, sole and foxing portion only of a shoe, a last over which a shoe may be formed, flexible means for applying pressure to said last, said last adapted to fit the mold and assist in the formation of the heel, sole and foxing portion therein, said mold being so formed as to closely fit the upper on the last at the foxing-line thereof to cause a resistance when under pressure and insure the plastic material being forced into the pores of the upper and adhere to the same, and means for applying heat to the material.

In testimony whereof I affix my signature in presence of two witnesses.

THOMAS MILLER.

Witnesses:
HOWARD E. BARLOW,
E. I. OGDEN.